(No Model.)

J. S. LAMAR.
COTTON CHOPPER.

No. 322,941. Patented July 28, 1885.

WITNESSES
M. E. Fowler
J. W. Garner

INVENTOR
J. S. Lamar
By his Attorney's
C. A. Snow & Co.

UNITED STATES PATENT OFFICE.

JAMES S. LAMAR, OF AUGUSTA, GEORGIA.

COTTON-CHOPPER.

SPECIFICATION forming part of Letters Patent No. 322,941, dated July 28, 1885.

Application filed June 4, 1885. (No model.)

*To all whom it may concern:*

Be it known that I, JAMES S. LAMAR, a citizen of the United States, residing at Augusta, in the county of Richmond and State of Georgia, have invented a new and useful Improvement in Cotton-Choppers, of which the following is a specification, reference being had to the accompanying drawings.

My invention relates to an improvement in cotton-choppers; and it consists in the peculiar construction and combination of devices that will be more fully set forth hereinafter, and particularly pointed out in the claims.

Figure 1:
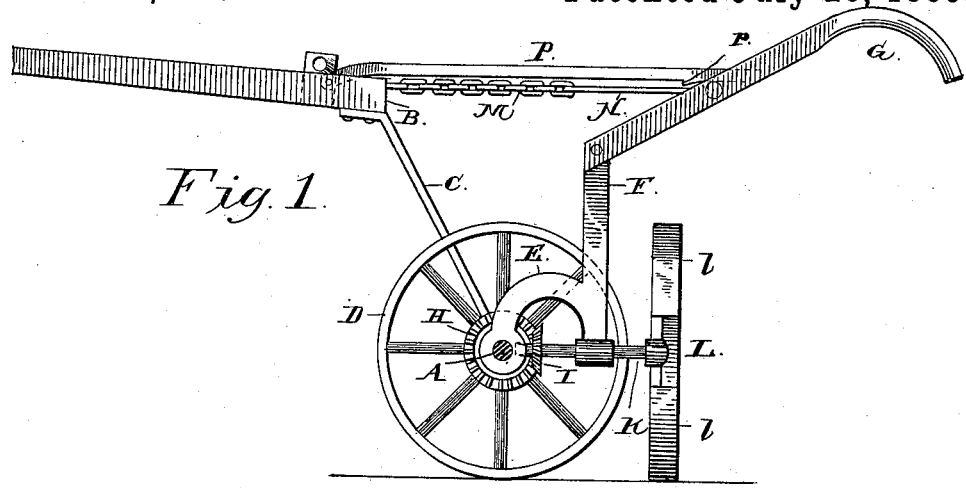
Figure 2:
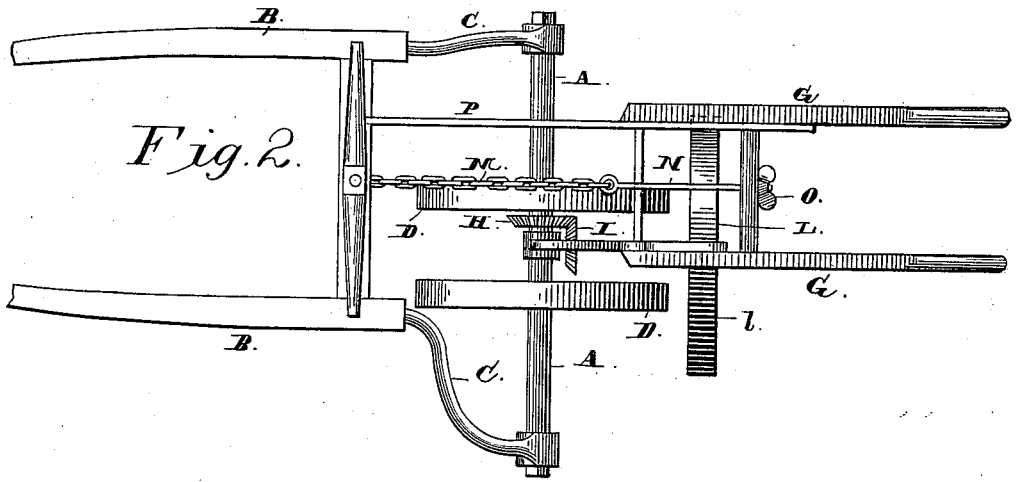
Figure 3:
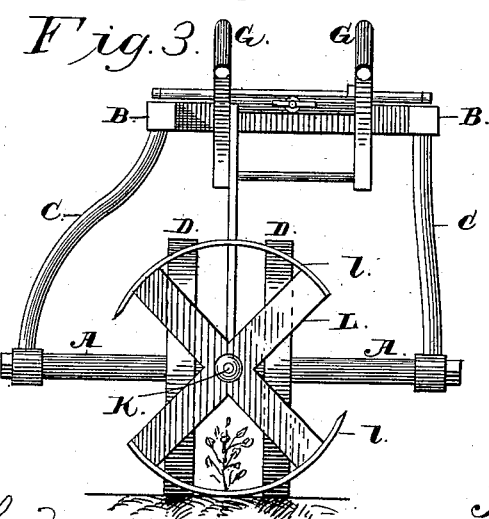

In the accompanying drawings, Figure 1 is a side elevation of a cotton-chopper embodying my invention. Fig. 2 is a top plan view of the same. Fig. 3 is a rear elevation.

A represents the driving-shaft, to the ends of which are journaled the lower ends of the thills B, which are adapted for the attachment of one horse, the rear iron bars, C, of said thills being bent slightly to one side, so as to allow the horse to travel along one side of the rows of plants without stepping on them. The wheels D are fixed to the shaft a little to each side of the center thereof, and these wheels are intended to run directly on the row and balance the machine, instead of running between the rows, as has heretofore been the practice, the wheels running a little on each side of the row of plants.

To the center of the shaft is pivoted a bearing-arm, E, having a rear vertical extension, F. To the upper end of the extension, F, are secured the handles G, which are similar to plow-handles, and are set a little to one side of the center of the machine, in line with the center of the thills, and thereby enable the operator to walk on the row, directly behind the horse, and a little to one side of the plants.

A miter gear-wheel, H, is fixed to the shaft A, near the center thereof, and meshes with a miter-pinion, I, on the shaft K, that is journaled in the arm E, and extends rearwardly from the center of the shaft A.

To the rear end of the shaft K is fixed a rotary chopper, L, having curved blades $l$ and spaces between said blades, as shown. A chain, M, extends from the cross-bar of the thills to the cross-bar of the handles, and maintains the shaft K normally in substantially a horizontal position. By pivoting the bearing-arm E to the shaft A, and by providing the handles for said arm, it will be readily understood that the chopper can be raised so as to lift the blades over obstructions or over an imperfect "stand" of plants.

To the rear end of the chain is attached a screw-threaded rod, N, that passes through the cross-bar of the handles, and on the rear-protruding end of this threaded rod is a thumb-nut, O, by means of which the chopper can be adjusted to cut to any desired depth.

P represents a bar that is pivoted to the cross-bar of the thills, and has its rear end supported by the cross-bar of the handles. This bar P has an offset, $p$, near its rear end. When the handles are raised, so as to elevate the chopper from the ground the offset $p$ drops behind the cross-bar of the handles and locks them in a raised position while turning at the end of a row or while passing to or from the field.

A cotton-chopper thus constructed is exceedingly simple, light, and cheap, is readily drawn by one horse, and is adapted to run on the rows.

Having thus described my invention, I claim—

1. The combination of the shaft A, the thills journaled on the ends thereof, the driving and supporting wheels fixed to the shaft near its center, the bearing-arm E, journaled or pivoted on the center of the shaft A, and having the vertical rear extension, F, the handles secured to said extension, the shaft K, journaled in arm E, and having the chopper and the connecting gearing, substantially as described.

2. The combination of the shaft A, the thills journaled on the ends thereof, the driving and supporting wheels secured near the center of the shaft, the bearing-arm E, journaled on the shaft, and having the vertical extension F, the shaft K, journaled in arm E, and having the chopper and a miter-pinion meshing with a miter gear-wheel on the shaft A, the handles secured to the extension F, the chain or rod connecting said handles with the thills, and means for lengthening and shortening said chain or rod, and the pivoted bar P, having the offset adapted to engage with the cross-bar of the handles, for the purpose set forth, substantially as described.

In testimony that I claim the foregoing as my own I have hereto affixed my signature in presence of two witnesses.

JAMES S. LAMAR.

Witnesses:
FORREST ADAIR,
H. W. COZART.